United States Patent [19]
Kaji et al.

[11] Patent Number: 4,775,956
[45] Date of Patent: Oct. 4, 1988

[54] METHOD AND SYSTEM FOR INFORMATION STORING AND RETRIEVAL USING WORD STEMS AND DERIVATIVE PATTERN CODES REPRESENTING FAMILES OF AFFIXES

[75] Inventors: Hiroyuki Kaji, Tama; Yoshihiko Nitta, Fujisawa, both of Japan

[73] Assignee: Hitachi, Ltd., Tokyo, Japan

[21] Appl. No.: 696,080

[22] Filed: Jan. 29, 1985

[30] Foreign Application Priority Data

Jan. 30, 1984 [JP] Japan ................................. 59-13459

[51] Int. Cl.⁴ ...................... G06F 15/40; G06F 15/38
[52] U.S. Cl. .................................... 364/900; 364/419
[58] Field of Search ... 364/200 MS File, 900 MS File, 364/300, 419

[56] References Cited

U.S. PATENT DOCUMENTS

| 4,342,085 | 7/1982 | Glickman et al. | 364/300 |
| 4,420,816 | 12/1983 | Yoshida | 364/900 |
| 4,439,836 | 3/1984 | Yoshida | 364/900 |
| 4,468,756 | 8/1984 | Chan | 364/900 |
| 4,499,553 | 2/1985 | Dickinson et al. | 364/900 |
| 4,542,478 | 9/1985 | Hashimoto et al. | 364/900 |
| 4,590,560 | 5/1986 | Sado | 364/900 |

Primary Examiner—Archie E. Williams, Jr.
Assistant Examiner—Thomas C. Lee
Attorney, Agent, or Firm—Antonelli, Terry & Wands

[57] ABSTRACT

An information storage/retrieval system stores information to be retrieved in a storage device having a first memory and a second memory. The first memory stores therein main records each containing an index word data, a derivative pattern code and information pieces while the second memory stores therein auxiliary records each containing a derivative pattern code and supplemental word data. Each derivative pattern code represents a group of words whose primary parts such as word stem parts are commonly combinable with the same remaining parts such as affix parts. Thus, each index word data is qualified by the accompanying derivative pattern code, and the supplemental word data includes data corresponding to the above-mentioned remaining parts. An information retrieval is made by searching in a first memory with respect the primary part of a keyword taken from, for example, its head and then in a second memory with respect to the remaining part of the keyword, thereby identifying the keyword. Relevant information to be outputted is found in at least one of the first and second memories on the basis of a supplmental word data in the second memory.

3 Claims, 9 Drawing Sheets

| No. | ⟨WORD STEM⟩ 211 | ⟨DERIVATIVE/PATTERN CODE⟩ 212 | ⟨COMMON PART OF EQUIVALENT WORD⟩ 213 | ⟨PROPER PART OF EQUIVALENT WORD⟩ 214 | |
|---|---|---|---|---|---|
| No. 1 | compil | 70 | コンパイ<br>KO M PA I | ルする<br>RU SU RU | ルラ<br>RU RA |
| No. 2 | efficien | 12 | 効率<br>KO RITSU | 的な<br>TEKI NA | 的に<br>TEKI NI |
| No. 3 | insist | 27 | 主張<br>SHU CHO | する<br>SU RU | して<br>SHI TE |
| No. 4 | persist | 27 | 固執<br>KO SHITSU | する<br>SU RU | して<br>SHI TE |
| No. 5 | proficien | 12 | 熟達<br>JUKU TATSU | した<br>SHI TA | して<br>SHI TE |
| No. 6 | sufficien | 12 | 十分<br>JU BUN | な<br>NA | に<br>NI |
| ---- | | ---- | | | |

FIG. 3

| 221 | 222 |
|---|---|
| ⟨DERIVATIVE PATTERN CODE⟩ | ⟨AFFIX/PART OF SPEECH DATA⟩ |

| | No. 1 | No. 2 | No. 3 | No. 4 | No. 5 |
|---|---|---|---|---|---|
| 12 | cy/N | t/ADJ | tly/ADV | | |
| 27 | –/V | ence/N | ency/N | ent/ADJ | ently/ADV |
| 70 | e/V | ation/N | er/N | | |

22

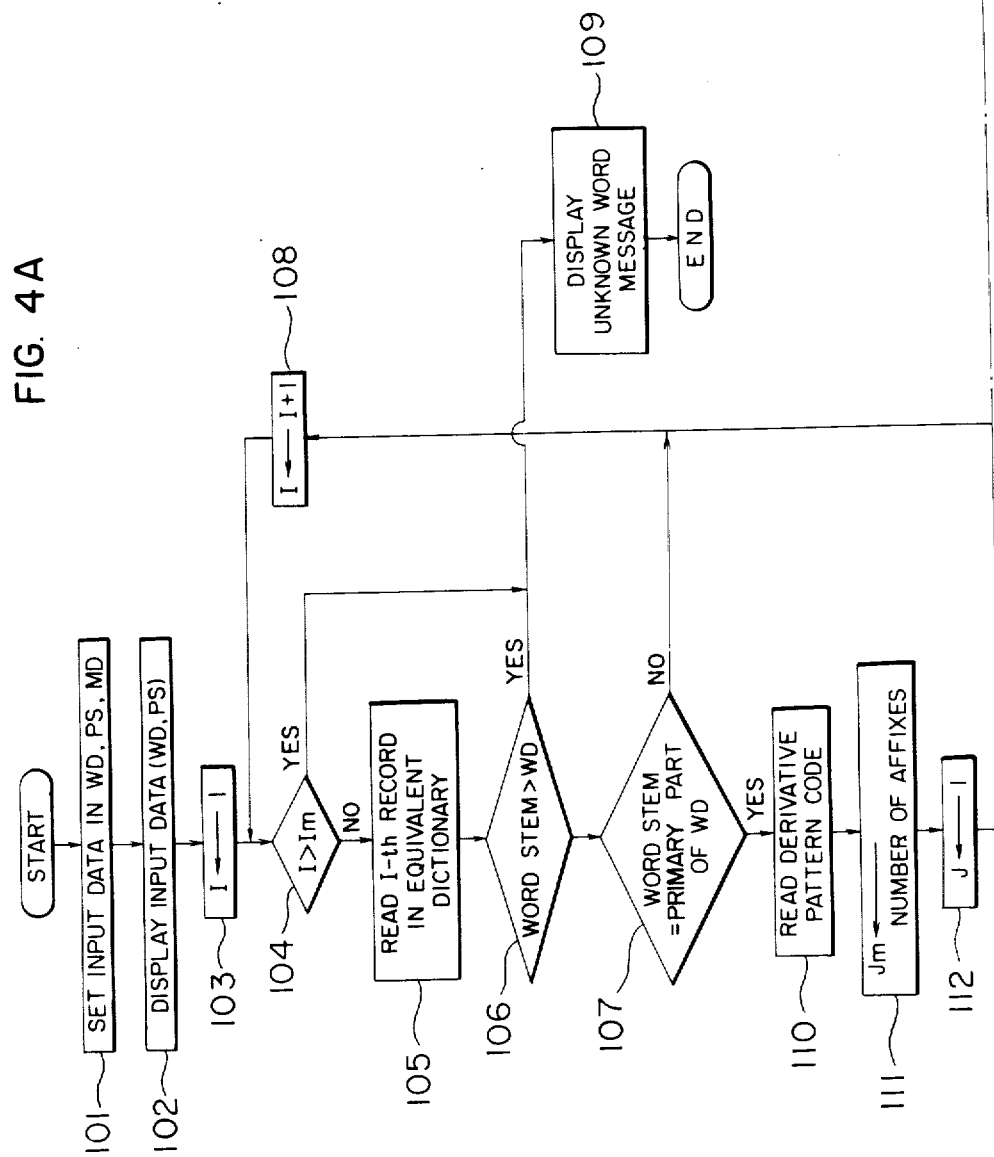

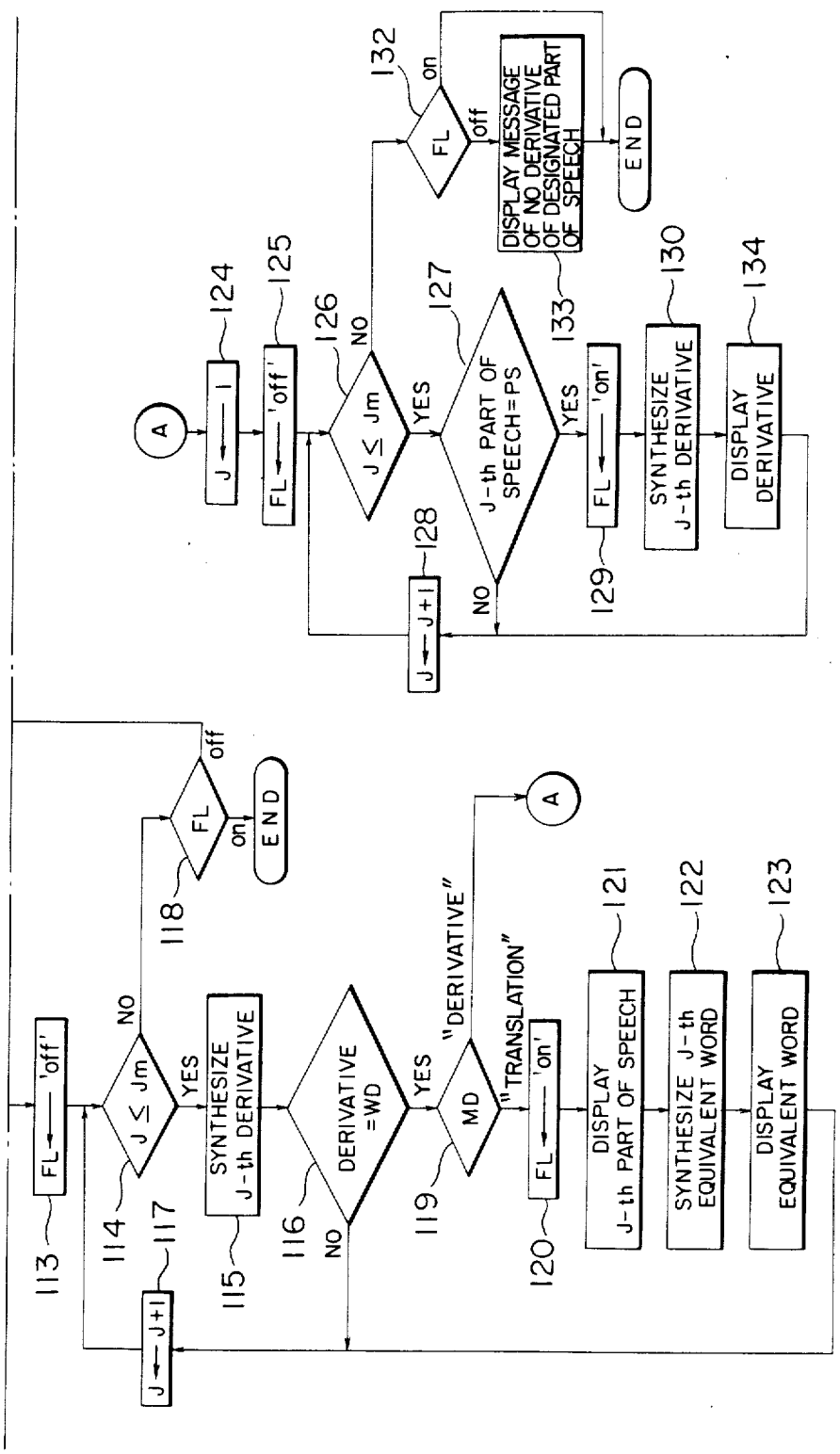

FIG. 5A

| INPUT ENGLISH WORD | PART OF SPEECH | JAPANESE EQUIVALENT |
|---|---|---|
| efficient | ADJ | 効率的な |
| | | KO RITSU TEKI NA |

FIG. 5B

| INPUT ENGLISH WORD | INPUT PART OF SPEECH | DERIVATIVE |
|---|---|---|
| insist | N | insistence |
| | | insistency |

METHOD AND SYSTEM FOR INFORMATION STORING AND RETRIEVAL USING WORD STEMS AND DERIVATIVE PATTERN CODES REPRESENTING FAMILES OF AFFIXES

BACKGROUND OF THE INVENTION

The present invention relates to a natural language processing system such as a machine translation system, a query answering system or a document data base system, and more particularly to storing and retrieving information by using a natural language word as an index in such a system.

In such a system, a file which stores related information (grammars, equivalent words, meanings, references, etc.) on a number of words and allows retrieval of the related information of any given word is an essential element. The capacity and retrieval efficiency of such a file significantly influences cost and any performance of the system and any improvement thereof therein is very important.

In a prior art information storage/retrieval system, a record for each word including related information of the word is created using the word as a key, and the records are assembled in a file. For a given word, matching between the word and the record key is determined to retrieve the desired related information. In this system, the following problem is encountered with respect to derivatives.

The word usually has many derivatives and the related information of those derivatives frequently include common information. For example, there are many instances where a plurality of derivatives differ from each other only in terms of part of speech but the descriptions of meaning thereof are substantially identical. In spite of such a circumstance, if the common information is entered repeatedly in a plurality of records corresponding to the respective derivatives, not only is memory capacity required to be increased but also maintenance (correction and supplement) of the stored information is troublesome. Accordingly, an appropriate one of a family of derivatives may be selected, the common related information may be recorded only in the record corresponding to the selected derivative, and this record may be referenced by other derivatives. However, this leads to a complexity of the file structure and a long retrieval time is required when the word other than the selected word is to be retrieved.

In a certain application of the file, it is required to retrieve a derivative of a given word. (For example, a dictionary for generating a target language in an automated translation system or a key word file in a document data base system.) In order to meet such a requirement, it is necessary in the prior art information retrieval system to store the derivatives as a kind of related information. As a result, the memory capacity required further increases, and the retrieval time is further extended if the related information of the derivatives are also retrieved.

SUMMARY OF THE INVENTION

It is an object of the present invention to provide an information storage/retrieval system and a method which eliminates duplicate inclusion of related information common to a family of derivatives to reduce a memory capacity required.

It is another object of the present invention to provide an information storage/retrieval system and method which can effectively carry out various modes of retrieval.

A word generally comprises a word stem which carries a primary meaning of the word and an affix creating a derivative, and a set of affixes which can be connected to one word stem are classified into a relatively small number of patterns. In accordance with a basic technical concept of the present invention, codes (hereinafter referred to derivative pattern codes) which designate the patterns of affix sets or derivative patterns, are used to classify the words.

Each main record of the file stored in a first memory uses a word stem as a key and contains all related information of a family of derivatives of that word stem and a derivative pattern code for the word stem. On the other hand, a derivative pattern dictionary which contains an auxiliary record including a set of affixes is stored in a second memory for each derivative pattern memory. In retrieving, the dictionary is looked up to identify an input word based on the word stem and the affix so that a record containing the desired information is retrieved. The related information in each record is divided into a part common to the derivatives and parts which are proper to the respective derivatives, and a complete information is synthesized when it is to be outputted.

In the above description and the following description of the embodiment, the term word stem does not strictly follow the morphology in the linguistics but it is a primary part of a word common to the word and its derivatives. The "remaining part", which is derived by removing the primary part from the word, is referred to as an affix.

The present invention significantly reduces the memory capacity required for the file without lowering the retrieval efficiency and remarkably improves the retrieval efficiency for the retrieval of the derivatives by unique handling of the derivatives and the related information.

The present invention is applicable to a wide range of fields from a portable electronic dictionary to a machine translation system or document data base system which uses a large scale computer. In the portable electronic dictionary, it is not difficult to implement the entire dictionary by a ROM. On the other hand, in the large system which handles a large volume of information, it is advantageous from a cost-performance viewpoint to store the derivative pattern dictionary in a main memory and store other files in a secondary (external) memory.

BRIEF DESCRIPTION OF THE DRAWINGS

FIG. 2 shows a content of an equivalent word dictionary in FIG. 1.

FIG. 3 shows a content of a derivative pattern dictionary in FIG. 1.

FIG. 4 which includes FIGS. 4A and 4B is a flowchart of retrieval processing of the electronic dictionary of FIG. 1.

FIGS. 5A and 5B show display screens illustrating retrieval results.

DESCRIPTION OF THE PREFERRED EMBODIMENTS

Figure 1:
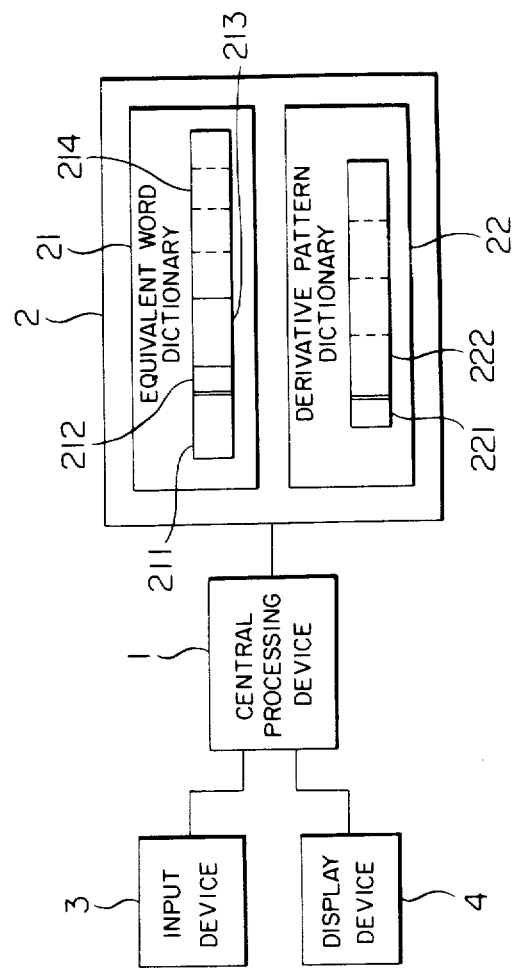
FIG. 1 is a block diagram of an electronic dictionary in accordance with one embodiment of the present invention.

Referring to FIGS. 1-3, an electronic dictionary in accordance with one embodiment of the present invention is explained. This dictionary has a function (translation function) to retrieve and display a part of speech and an equivalent word in Japanese of an input word in English, and a function (derivative function) to retrieve and display those derivatives of the input word in English which have the same part of speech as the input word, when the input word in English and the part of speech thereof are inputted. As shown in FIG. 1, the configuration comprises a central processing unit 1 for retrieving and controlling I/O devices, a memory unit 2 including first and second memories containing an equivalent word dictionary 21 and a derivative pattern dictionary 22, an input device 3 having character information input keys, and function keys for designating the "translation" function, the "derivative" function and other functions, and a display device 4 for displaying character information. Each main record in the equivalent word dictionary 21 comprises a word stem field 211 which is a first partial word data, a derivative pattern code field 212, a common part of Japanese equivalents field 213 and proper part of Japanese equivalents fields 214. As many proper part fields 214 as the number of derivatives derived from the word stem are included. Each auxiliary record in the derivative pattern dictionary 22 comprises a derivative pattern code field 221 similar to the derivative pattern code field 212, and affix and part of speech data fields 222 which is a second partial word data. As many affixes and part of speech data fields as the number of affixes included in the derivative pattern are included. The same affix for a different part of speech is handled as a different affix.

Specific examples of the contents of the records in the equivalent word dictionary 21 and the derivative pattern dictionary 22 are shown in FIGS. 2 and 3, respectively. As described above, in the present invention, the term "word stem" does not strictly follow the morphology of the linguistics but it is defined as a partial character sequence which is common to spellings of a family of derivatives. For example, for the family of derivatives {efficiency, efficient, efficiently}, "efficien" is the word stem, for the derivative family {insist, insistence, insistent, insistently}, "insist" is the word stem, and for the derivative family {compile, compilation, compiler}, "compil" is the word stem. The term "affix" is defined as a partial character sequence which is created by removing the word stem from the spelling of the word. For example, for the word stem "efficien", "cy", "t", "tly" are affixes for creating noun (N), adjective (ADJ) and adverb (ADV), respectively. The word stems "proficien" and "sufficien" can be connected to the same set of affixes as that described above. This set of affixes is common to those word stems and is a derivative pattern which characterizes those word stems. The set of affixes is designated by the derivative pattern code. A code "12" is assigned to the above set of affixes. Similarly, a derivative pattern code "27" is assigned to the set of affixes which generate the derivative family {insist, insistence, insistency, insistent, insistently} and the derivative family {persist, persistence, persistency, persistent, persistently}, and a derivative pattern code "70" is assigned to the set of affixes which generate the derivative family {compile, compilation, compiler}.

In the derivative pattern code field 221 in each record (FIG. 3) of the derivative pattern dictionary 22, the derivative pattern code is stored as a search index, and in the affix and part of speech data field 222, the affixes belonging to the set of affixes corresponding to the derivative pattern code are stored together with the parts of speech of the words to be generated by the affixes. In the word stem field 211 in each record (FIG. 2) of the equivalent word dictionary 21, the word stem of the derivative family is stored as a search index, and in the derivative pattern code field 212, the derivative pattern code designating the set of affixes which can be connected to that word stem is stored. For example, the derivative pattern code field of the record which contains the word stem "efficien" stores "12". The equivalent word information stored in the equivalent word dictionary 21 is divided into the common part to the equivalent words of the derivatives (common part of equivalent words field 213) and the proper parts to the equivalent words of the derivatives (proper part of equivalent words field 214). For example, equivalent words "KO RITSU" "KO RITSU TEKI NA" and "KO RITSU TEKI NI" of the words "efficiency", "efficient" and "efficiently", respectively, are divided into the common part "KORITSU" and proper parts "—", "TEKI NA" and "TEKI NI" and stored in the order corresponding to the arrangement of the affix and part of speech data in the derivative pattern dictionary 22. "—" represents that there is not character sequence in the proper part. The records in the equivalent word dictionary are orderly arranged in the alphabetic sequence of the word stems to allow retrieval by sequential searching, and the records in the derivative pattern dictionary are orderly arranged in the order of the derivative pattern codes.

The processing carried out by the central processing unit 1 to attain the "translation" function and the "derivative" function is explained with reference to FIG. 4. In FIG. 4 and the following explanation, MD denotes an indicator which indicates the processing mode (translation function or derivative function) of the system, which is set by the function key of the input device 3, WD denotes a register for retaining an input word, PS denotes a register for retaining an input part of speech code, FL denotes a flag indicating a retrieval result, I denotes a counter which indicates a record number of the record to be read from the equivalent word dictionary 21, J denotes a counter which indicates an affix/part of speech data number in the record in the derivative pattern dictionary 22, Im denotes a register which stores a total number (constant value) of the records in the equivalent word dictionary 21, and Jm denotes a register which retains the total number of affix/part of speech data in the records retrieved from the derivative pattern dictionary 22 (which number differs from record to record and stored in an appropriate field in the record). The registers and counters MD, WD, PS, FL, I, Im, J and Jm are constructed by an internal memory in the central processing unit 1.

The processing shown in FIG. 4 is started when a user inputs an English word (in the translation mode) or an English word and a part of speech (in the derivative mode) through the keyboard of the input device 3 and depresses a function key to designate the desired processing mode. The input data is registered in the registers WD and PS and the processing mode (translation/-derivative) designated by the function key is registered in the register MD (101), and the data set in WD and PS are displayed (102). Then, the content of I is set to "1" (103), the I-th record in the equivalent word dictionary 21 is read in (105), and matching between the word stem of the record and the front portion of the content of WD is checked (107). This process is repeated until the matched record is detected, while incrementing the content of I (108). If I>Im (104) or the word stem of the I-th word represented in binary form is larger than the content of WD (106), a message indicating that the input word is an unknown word (non-included word) is sent to the display device (109) and the processing is terminated.

When the record having the word stem which matches to the front portion of the content of WD is detected, the record corresponding to the derivative pattern code in that record is read from the derivative pattern dictionary 22 (110). Then, the total number of the affix/part of speech data in the record is set into Jm (111), the content of J is set to "1" (112), and FL is reset (113). Then, a derivative is synthesized from the J-th affix and word stem of the record read in the step 110 (115), and matching between it and the content of WD is checked (116). This process is repeated as long as J≦Jm (114) while the content of J is incremented (117). If the derivative which matches the content of WD is not synthesized while J≦Jm (118), the next record in the equivalent word dictionary is read (108, 105) or the retrieval is terminated. If the synthesized derivative matches the content of WD, the subsequent processing depends on the processing mode set in MD (119).

If the processing mode set in MD is the translation mode, FL is set (120) and the part of speech and the equivalent word are displayed. Specifically, the part of speech data for the J-th affix in the auxiliary record of the derivative pattern dictionary 22 is sent to the display device 4 (121), and then the equivalent word is synthesized from the common part of equivalent words field 213 and the J-th proper part of the equivalent words (122) of the I-th record of the equivalent word dictionary 21 and it is sent to the display device (123). The flow from the step 123 to the step 117 is to check if another affix/part of speech data is present for the input keyword of the same spelling.

On the other hand, if the processing mode set in MD is the derivative word, the process branches in the step 119 to synthesize and display the derivative of the part of speech designated by PS, in the following manner. First, the content of J is set to "1" (124) and FL is reset (125). Then, matching between the J-th part of speech in the record in the derivative pattern dictionary and the content of PS is checked (127) and this process is repeated so long as J≦Jm (126) while the content of J is incremented (128). If the J-th part of speech matches the content of PS, FL is set (129), the derivative is synthesized from the J-th affix in the derivative pattern dictionary record and the word stem (130), and it is sent to the display device (131). If the part of speech which is the same as the content of PS is not detected while J≦Jm (132), a message indicating that the word doesn't have any derivative of the part of speech designated by PS is sent to the display device (133). The flow from the step 131 to the step 128 is to check if another derivative is present for the input part of speech.

FIGS. 5A and 5B show examples of information displayed on the display device 4 after the above processing. FIG. 5A shows information displayed when an English word "efficient" was inputted and the function key "translation" was depressed. The processing by the central processing unit 1 is briefly explained. The input word is displayed in the step 102, and in the step 105 the equivalent word dictionary record corresponding to the word stem "efficien" whose front part is the same as "efficient" is retrieved. Thus, the derivative pattern code "12" is identified and the corresponding derivative pattern dictionary record is read in the step 110. This record shows that the affixes "cy", "t" and "tly" may be connected to the word stem "efficien", and the derivatives "efficiency", "efficient" and "efficiently" are sequentially synthesized in the step 115. Those derivatives are sequentially compared with the input word "efficient" in the step 116 and the matching between the second derivative and the input word is detected. Then, the part of speech "ADJ" paired with the second affix is displayed in the step 121. In the step 122, an equivalent word "KO RITSU TEKI NA" is synthesized from the data "KO RITSU" in the common part of equivalent words field and the data "TEKI NA" in the second proper part of equivalent words field in the equivalent word dictionary record corresponding to the word stem "efficient", and it is displayed in the step 123.

FIG. 5B shows information displayed when the English word "insist" and the part of speech "N" were inputted and the function key "derivative" was depressed. The input English word and part of speech are first displayed, then the equivalent word dictionary record corresponding to the word stem "insist" is retrieved, the derivative pattern dictionary record corresponding to the derivative pattern code "27" is read, the derivative which is the same as the input word "insist" is synthesized (the matching shows that the input data is a word), and the process is branched in the step 119, in the same manner as that in FIG. 5A. Then, in the step 127, the input part of speech "N" is compared with the part of speech data in the derivative pattern dictionary record, and the second affix "ence" and the third affix "ency" are detected to be the affixes which create the noun (N). In the step 130, words "insistence" and "insistency" are synthesized from the word stem "insist" and those affixes and they are displayed in the step 131.

While only suffixes are shown as the affix in the present embodiment, it should be understood that the present invention is also applicable to a prefix or a combination of the suffix and the prefix. In the present embodiment, the sequential search method which is the simplest method for searching tne dictionary is used in the arrangement of the main records in the equivalent word dictionary 21, although other known method, for example, binary search method, hashing method or index search method may be used.

In the system shown in FIG. 1, the central processing unit may be a 16-bit microcomputer (for the electronic dictionary) or a general purpose large computer (for the machine translation system). The main memory unit 2 may be a magnetic tape unit or a magnetic disk unit. The second memory 22 may be the internal memory of the central processing unit 1.

In accordance with the present embodiment, the memory capacity required is reduced by sharing the affix/part of speech data among a number of word stems having the same set of affixes. As the number of derivative patterns (the number of sets of affixes) is much smaller than the total number of words or word stems, it is sufficient to allot two bytes to the derivative pattern code. Because of the common part in the description of the equivalent word information, the memory capacity is reduced. The derivative retrieval function is attained without increasing the memory capacity, as required in the prior art system. While the English word (input) and the Japanese word (output) are handled in the present embodiment, any languages may be used as input language and output language.

Figure 6:
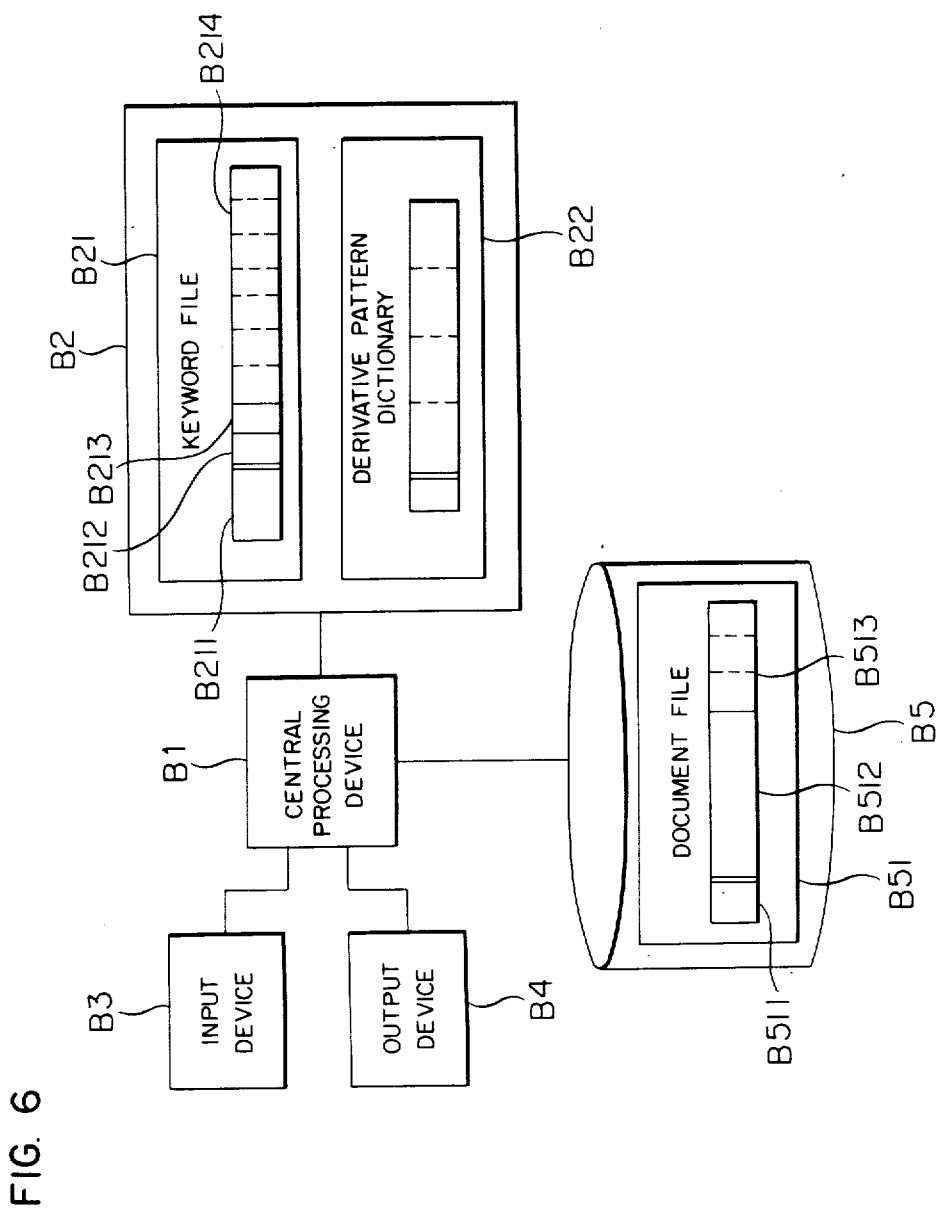
FIG. 6 is a block diagram of a document data base system in accordance with another embodiment of the present invention.

An embodiment described below relates to a document data base system having a keyword extraction function and a document retrieval function. Referring to FIG. 6, the system comprises a central processing unit B1 for performing the keyword extraction/document retrieval and controlling input/output devices, a storage device B2 having first and second memories for storing a keyword file B21 and a derivative pattern dictionary B22, an input device B3 for inputting character information, an output device B4 for outputting character information, and a large capacity storage device B5 which is a third memory for storing a document file B51. Each main record in the keyword file B21 comprises a keyword word stem field B211 which is a first partial word data, a derivative pattern code field B212, a normalized keyword number field B213 which is common data and document number fields B214 which are individual (proper) data. As many document number fields as the number of documents having that keyword word stem are included. The derivative pattern dictionary B22 may be identical to the derivative pattern dictionary 22 of the previous embodiment but the part of speech data is not necessary. Each record in the document file B51 comprises a document number field B511, a text field B512 and normalized keyword fields B513. As many normalized keyword fields as the number of keywords extracted from that text are included.

Figure 7A:
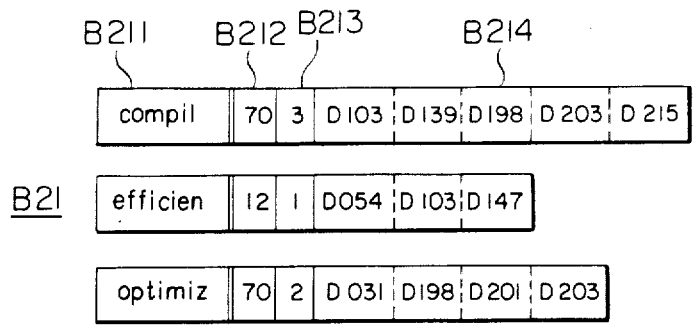
FIGS. 7A and 7B show contents of a keyword file and a document file in FIG. 6 before extraction of a keyword.
Figure 7B:
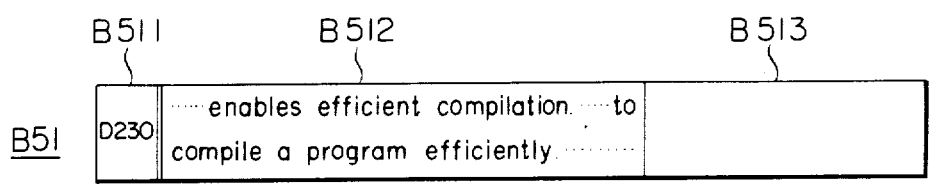

Specific examples of the contents of the keyword file B21 and the document file B51 are shown in FIGS. 7A and 7B and FIGS. 8A and 8B, respectively. FIG. 7A shows the keyword file for the document D230 shown in FIG. 7B before the extraction of the keywords, and FIG. 8 shows the keyword file after the extraction of the keywords.

Figure 8A:
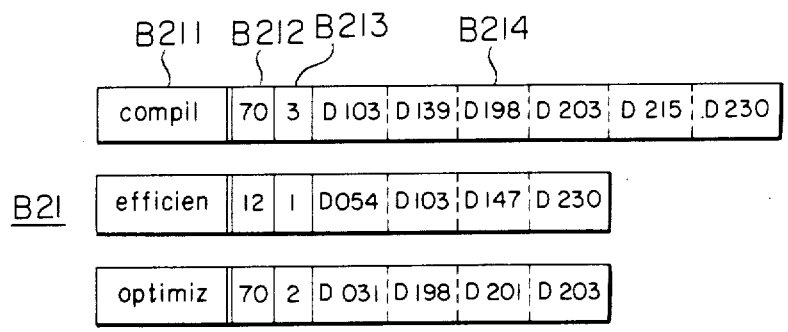
FIGS. 8A and 8B show contents of the keyword file and the document file after the extraction of the keyword.
Figure 8B:
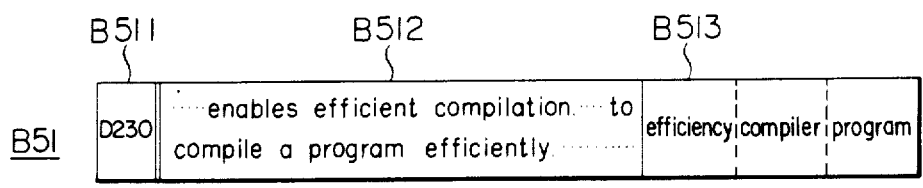
Figure 9:
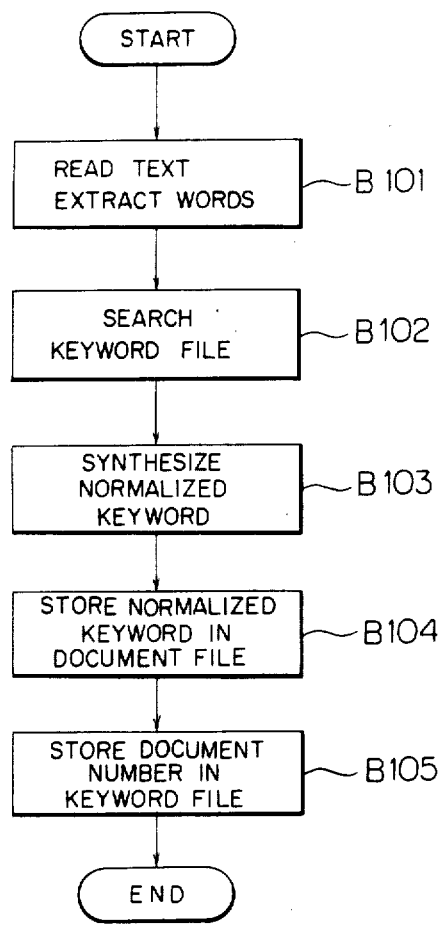
FIG. 9 is a flowchart of keyword extract processing in the system of FIG. 6.

The processing of the central processing unit B1 to achieve the keyword extraction function which is carried out when new document is added to the document file B51 is shown in a flowchart of FIG. 9. In a first step (B101), the text B512 of the document (e.g., D230) is read from the document file B51 and words are extracted. For example, words "enables", "efficient", "compilation", "to" and "compile" are extracted from the text of the document number D230 of FIG. 7B as candidates of the keywords. In a second step (B102), the keyword file B21 is searched for the words extracted in the first step. This process is essentially identical to the looking-up of the equivalent word dictionary 21 in the previous embodiment (until the step 119 in FIG. 4). The words which cannot be the keywords, such as "enable", "to" and "a" are not recorded in the keyword file B21. Accordingly, the words "efficient", "compilation", "compile" and "program" retrieved in the second step are left as the candidates for the keyword. In a third step (B103), the words left as the candidates for the keyword are translated to normalized keywords. Since the derivative pattern code B212 and the normalized keyword number B213 are recorded in the keyword file record, the derivative corresponding to the normalized keyword number is synthesized by referring to the derivative pattern dictionary record corresponding to the derivative pattern code, for use as the normalized keyword. For example, for the keyword candidate "efficient", the keyword file record corresponding to the word stem "efficien" contains the derivative pattern code "12" and the normalized keyword number "1", and the derivative "efficiency" synthesized from the first affix "cy" in the derivative pattern dictionary record (see FIG. 3) corresponding to the derivative pattern code "12" and the word stem "efficien" is used as the normalized keyword. In a fourth step (B104), duplication among normalized keywords synthesized in the third step are resolved and the keywords are recorded in the keyword field B513 of the document file record (see FIG. 8B). For example, the normal keyword "compiler" is obtained from the words "compilation" and "compile" in the text of the document number D230 and only one normalized keyword is written into the document file record. The normalized keyword written into the document file will help a user examining the contents of the documents in a short time when two or more documents are retrieved. In a fifth step (B105), the document number of the currently processed document is written into the document number field B214 in the keyword file record corresponding to the word stem of the extracted normalized keyword (see FIG. 8A).

The above keyword extract processing is characterized by normalizing the keyword by using the derivative pattern dictionary. By the normalizing process, the duplicate extraction of a member of keywords in the form of derivative can be avoided. In spite of the fact that only the normalized keywords are extracted and recorded, there is no problem in retrieving, as will be apparent from the document retrieval processing to be described below. The advantage of use of only the normalized keywords is great from a standpoint of preparing a bibliography.

Figure 10:
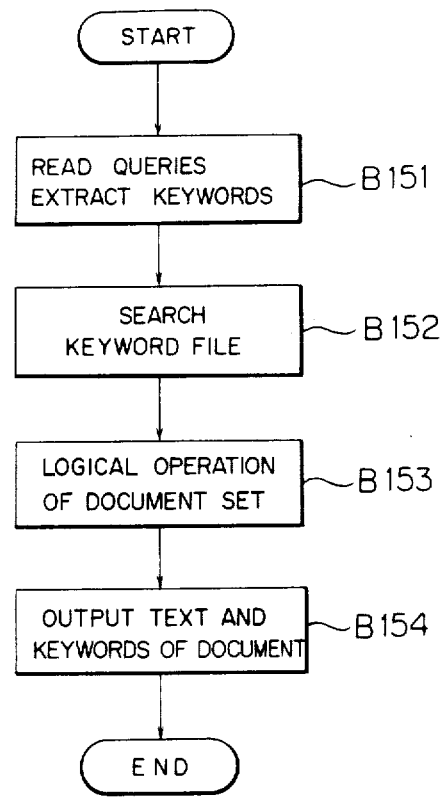
FIG. 10 is a flowchart of document retrieval processing in the system of FIG. 6.

The processing carried out by the central processing unit B1 to achieve the document retrieval function is shown in a flowchart of FIG. 10. In a first step (B151), a query is inputted by the input device B3 and words used as retrieval keys are extracted. In a second step (B152), the keyword file B21 is searched for each retrieval key. This step is essentially identical to the retrieval step of the equivalent word dictionary 21 in the previous embodiment (until the step 119 in FIG. 4). The keyword file records retrieved in the second step indicate a set of documents corresponding to the respective retrieval keys. In a third step (B153), the document numbers of the documents to be outputted are selected by a set operation in accordance with the query. In a fourth step (B154), the texts of the documents to be outputted and the normalized keywords are read from the document file B51 and sent to the output device B4.

For example, when a query "compiler & efficiency" is used for the files B21 and B25 shown in FIGS. 8A and 8B, the documents of the document numbers D103 and D230 are retrieved. It should be noted here that the document of the document number D230 is retrieved although the text thereof does not include the word "compiler" or "efficiency". The same result is obtained when the non-normalized keyword "efficient" is used in place of the key "efficiency" in the query. This is the advantage obtained by the use of the derivative pattern dictionary B22. A retrieval function which is similar, at a first glance, to the above is attained by the prior art method in which forward matching is carried out. However, because the retrieval by the forward matching limits the input data to a front portion of the keyword and "mechanically" processes only the characters, it may retrieve a document which includes a keyword which has forward matching in the spelling but has no semantic relation. On the other hand, in the present embodiment, such a retrieval error is completely prevented because the derivative family is checked by the derivative pattern dictionary.

In the system shown in FIG. 6, the central processing unit B1 may be a general purpose large computer, the storage device B2 may be a magnetic disk device, and the large capacity memory B5 may be a magnetic disk device, a magnetic tape device or a mass storage system.

We claim:

1. An information storage/retrieval system having an input means, a storage means including a first and second memory means and a processing means coupled to said input means and said storage means wherein:

said first memory means stores therein a plurality of main records, each main record containing first partial word data comprising a word stem, a derivative pattern code provided for each individual word stem which represents a family of affixes of the word stem with each derivative pattern code being usable with a plurality of possible word stems, and a number of information pieces;

said second memory stores therein a plurality of auxiliary records, each auxiliary record containing a single derivative pattern code and a plurality of second partial word data associated with said single derivative pattern code, each of said second partial word data in each of said auxiliary records including supplemental data which constitutes a word when combined with first parallel word data in any one of the main records in said first memory which contain a same derivative pattern code as the derivative pattern code contained in the associated auxiliary record; and said information pieces in each of said main records including common data and a plurality of proper data, common data in any one of said main records being indicative of location of one of said plurality of second partial word data in that one of said auxiliary records which contains a same derivative pattern code as said one main record contains, the second partial word data indicated by said common data being usable with the first partial word data in said one main record to produce a normalized keyword contributing to representation of each of the proper data in said one main record.

2. A system according to claim 1, in which the system further comprises a third memory means for storing therein additional data concerning said proper data in said main records and said normalized keywords.

3. In an information storage/retrieval system having an input means, a storage means and a processing means coupled to said input means and said storage means wherein said storage means includes a first memory means for storing therein a plurality of main records, each main record containing first partial word data comprising a word stem, a derivative pattern code provided for each individual word stem which represents a family of affixes of the word stem with each derivative pattern code being usable with a plurality of possible word stems, and a number of information pieces, said information pieces in each of said main records including common data and a plurality of proper data, the common data in any one of said main records being indicative of a location of one of a plurality of second partial word data in that one of a plurality of auxiliary records which contains the same derivative pattern code as said one main record contains, the second partial word data indicated by said common data being combined with the first partial word data in said one main record to produce a normalized keyword contributing to representation of each of the proper data in said one main record, and a second memory for storing therein the plurality of auxiliary records, each of said auxiliary records containing a single derivative pattern code and a plurality of the second partial word data associated with said single derivative pattern, each of said second partial word data in each of said auxiliary records including supplemental data which constitutes a word when combined with the first partial word data in any one of the main records in said first memory which contain a same derivative pattern code as the derivative pattern code contained in the associated auxiliary record, a process comprising:

inputting at least one keyword from said input means;

searching said first memory means for one of said main records including that first partial word data which matches a primary part of said keyword;

determining a corresponding auxiliary record in said second memory means on the basis of the derivative pattern code in said searched one main record;

comparing a remaining part of said keyword with the plurality of second partial word data in said determined auxiliary record to find a second partial word data which, when combined with said first partial word data, matches said keyword;

determining, on the basis of said found second partial word data, relevant information in at least one of said first and second memory means;

determining, on the basis of the common data in said one main record, a normalized keyword in said determined auxiliary record in said second memory means;

storing said normalized word in a third memory means; and storing an additional proper data concerning said inputted at least one keyword in each of those main records which contain first partial word data matching the primary part of said inputted at least one keyword, said third memory means having stored therein details of each of said proper data and of said additional proper data.

* * * * *